United States Patent [19]

Lucking

[11] Patent Number: 5,167,159
[45] Date of Patent: Dec. 1, 1992

[54] TENSION TRANSDUCER

[76] Inventor: William M. Lucking, #21 - 1145 Fairfield Road, Victoria, British Columbia, Canada, V8V 3A9

[21] Appl. No.: 629,675

[22] Filed: Dec. 18, 1990

[51] Int. Cl.$^5$ ............................................. G01L 5/10
[52] U.S. Cl. ........................... 73/862.451; 73/862.474
[58] Field of Search ................ 73/379, 862.19, 862.28, 73/862.45, 862.47, 862.48

[56] References Cited

U.S. PATENT DOCUMENTS

| | | | |
|---|---|---|---|
| 2,795,136 | 6/1957 | Matt | 73/862.48 |
| 3,653,258 | 4/1972 | King | 73/862.48 X |
| 4,141,245 | 2/1979 | Brandstetter | 73/862.46 |
| 4,171,640 | 10/1979 | van Mastrigt | 73/862.45 |
| 4,423,630 | 1/1984 | Morrison | 73/379 |
| 4,625,551 | 12/1986 | Carnielli | 73/379 |
| 4,811,612 | 3/1989 | Mercat | 73/862.34 |

FOREIGN PATENT DOCUMENTS

| | | |
|---|---|---|
| 432602 | 1/1946 | Canada . |
| 453133 | 12/1948 | Canada . |
| 458345 | 7/1949 | Canada . |
| 763689 | 7/1967 | Canada . |
| 773820 | 12/1967 | Canada . |
| 775849 | 1/1968 | Canada . |
| 790301 | 7/1968 | Canada . |
| 1139964 | 1/1983 | Canada . |
| 3150149A1 | 6/1983 | Fed. Rep. of Germany . |
| 2394790 | 2/1979 | France | 73/379 |
| 2493983 | 5/1982 | France . |

Primary Examiner—Michael Razavi
Assistant Examiner—Elizabeth L. Shopbell
Attorney, Agent, or Firm—John R. Uren

[57] ABSTRACT

An apparatus (30) for measuring the tension in an elongate flexible member (20) comprises a body member (32) provided with first and second engagement means (38, 40) thereon. The first and second engagement means (38, 40) are arranged in opposed relationship and define a non-linear path therebetween for receiving a tensioned elongate flexible member (20) along the path and in engagement with the first and second engagement means (38, 40) to apply a lateral force between the first and second engagement means (38, 40). The first and second engagement means (38, 40) allow longitudinal movement of the tensioned member (20) through the apparatus (30). The apparatus (30) further comprises means for measuring the speed of movement of the flexible member. The speed measuring means comprises means for measuring the frequency of cyclical variations in the lateral force. A chain tension measuring device for a bicycle, incorporating the tension measuring apparatus or transducer (30), is also provided and includes mounting apparatus (70) for mounting the transducer (30) on a bicycle.

26 Claims, 11 Drawing Sheets $F = T \sin \theta$

TENSION TRANSDUCER

INTRODUCTION

This invention relates to a tension transducer. In particular, it relates to a method of measuring the tension of an elongate flexible member, such as a bicycle chain, and apparatus therefor.

BACKGROUND OF THE INVENTION

Human power vehicles, such as bicycles, are often used for purposes where it would be very desirable for a rider or other interested party to know the amount of physical quantities such as force exerted by the rider, and work (or energy) input into the vehicle by the rider, and time rate of energy input (power). Stationary devices for these measurements are common in laboratories, gymnasiums and health spas. However, there may be a preference for exercising on a moving vehicle, e.g., a track cyclist who wishes to study cycling or a cycling enthusiast who is bored on a stationary machine.

Accurate measurement of these physical quantities would allow objective evaluation and therefore, control of performance. Such a device will help high performance riders and researchers to instantly read and record performance objectively in the desired environment. At the other end of the scale, the casual exercise rider can see how much effort (calories) has been expended and note improvement in his or her performance for psychological motivation and individualized controlled training.

SUMMARY OF THE INVENTION

According to one aspect of the invention, there is provided an apparatus for measuring the tension in an elongate flexible member, comprising a body member provided with first and second engagement means thereon, said first and second engagement means being arranged in opposed relationship and defining a non-linear path therebetween for receiving a tensioned elongate flexible member along said path and in engagement with said first and second engagement means to apply a lateral force between said first and second engagement means.

Also according to the invention, there is provided a method of measuring the tension of an elongate flexible member comprising the steps of applying a lateral force between opposed first and second engagement means on a solid body member by means of said flexible member.

According to another aspect of the invention, there is provided a chain tension measuring device for a bicycle, comprising a transducer for engagement with the bicycle chain to measure the tension of the chain and mounting apparatus for mounting the transducer to a bicycle frame, wherein the transducer comprises a body member provided with first and second engagement means thereon, said first and second engagement means being arranged in opposed relationship and defining a non-linear path therebetween for receiving the bicycle chain along said path and in engagement with said first and second engagement means to apply a lateral force between said first and second engagement means.

Further objects and advantages of the invention will become apparent from the description of a preferred embodiment of the invention below.

DESCRIPTION AND OPERATION OF SPECIFIC EMBODIMENTS OF THE INVENTION

Introduction

Figure 1:
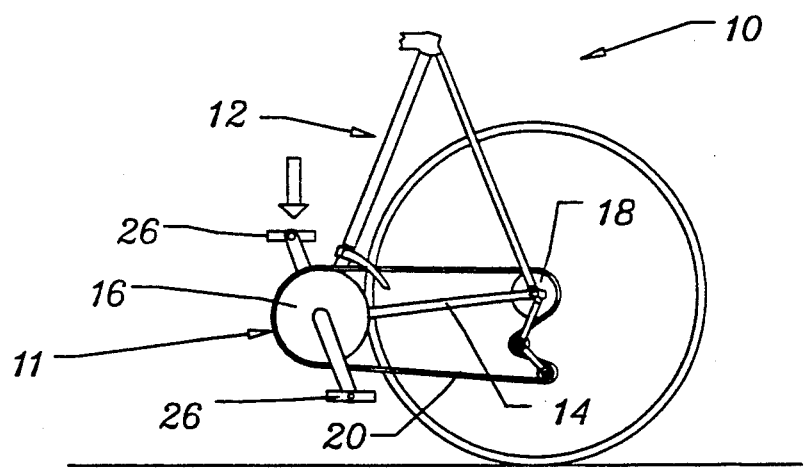
FIG. 1 is a fractional side view of a bicycle with a typical derailleur transmission.

Most bicycles and many human power devices utilize a chain drive to transmit power. Shown in FIG. 1 is a derailleur type of gearing system for a bicycle to which the tension transducer of the present invention may be applied.

Figure 2A:
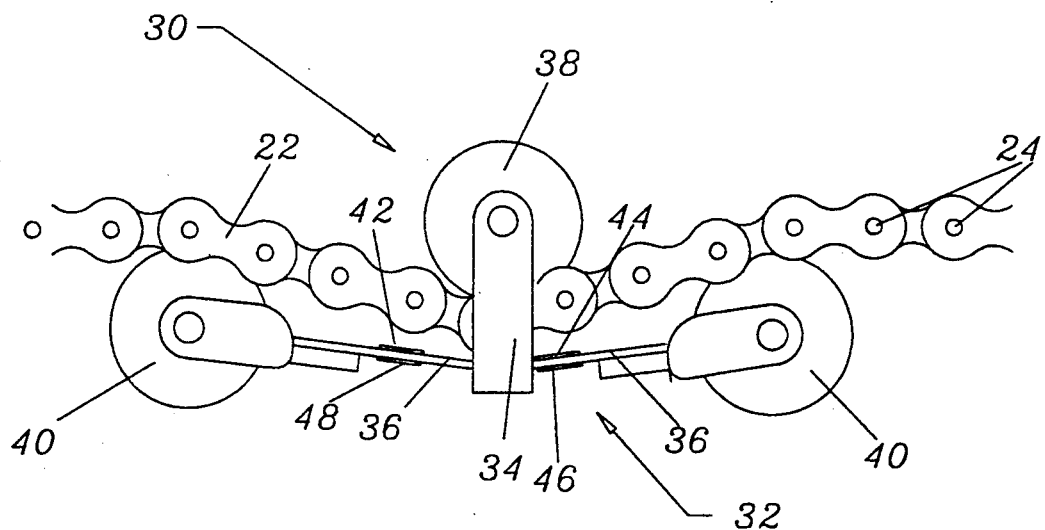
FIG. 2A is a side view of a tension transducer, according to one embodiment of the invention, shown in engagement with a bicycle chain.

In the drawing, reference numeral 10 generally indicates the bicycle and reference numeral 11 generally indicates a common derailleur type gearing system. The bicycle has a frame 12, which includes a rearwardly extending tube 14, extending between the front and rear sprockets 16 and 18, respectively. Typically a plurality of sprockets 16 and 18, of different sizes, are provided. Reference numeral 20 indicates the bicycle chain, which comprises a plurality of chain links 22 pivotally connected together about roller centres or axes 24 (FIG. 2A and FIG. 7D). Force is applied by a rider to the pedals 26, as shown by the arrow in FIG. 1.

Power can be determined from force and velocity. To determine the power transmitted through a rigid element (e.g. a chain link) in the transmission, the net force on the element and its velocity in that direction must be measured. The chain 20 is a convenient place to measure power because it is easily accessed and both quantities are available there. However, devices which are capable of achieving this in a practical and economical manner have not been developed, as far as the applicant is aware. If, for example, force was measured at the pedals 26, then velocity would be measured elsewhere. Therefore, measurements would be taken in three separate locations, which is undesirable.

The instantaneous power transmitted through a chain link 22 is determined from $$P = T v \qquad (1)$$

where T is the tension in the chain and v is the speed of the chain.

The energy (or work) transmitted by the chain 20 between a time t0 and t1 is determined from the chain tension and distance travelled under tension, i.e.

$$E = \int_{t_0}^{t_1} T \, dl \qquad [2]$$

and the average power during the time interval is given by $$P = E/(t_1 - t_0) \qquad (3)$$

Chain Tension Measurement

Figure 3:
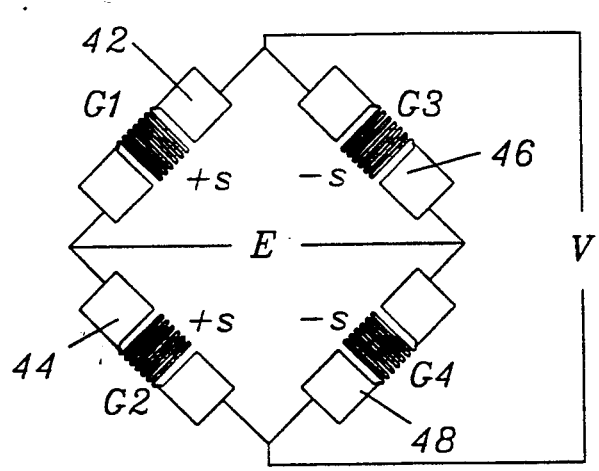
FIG. 3 is a diagrammatical illustration of electrical strain gauges of the transducer of FIG. 2A connected in a bridge circuit.

Referring to FIG. 2A, a transducer device for measuring chain tension is generally indicated at 30. The transducer 30 comprises a solid body member 32 which has a central part 34 and a pair of arms 36 extending equidistantly therefrom. A first wheel or roller 38 is provided on the central part 34 and a pair of secondary wheels or rollers 40 are provided on the ends of the arms 36. The wheels 38, 40 are preferably toothed wheels, or sprockets, to facilitate engagement with the chain 20. Electrical resistance strain gauges 42, 44, 46 and 48 are provided in pairs on the opposite sides of the arms 36, as shown in FIG. 2A. The gauges 42, 44, 46, 48 are connected together in a bridge circuit as shown in FIG. 3.

Figure 2B:
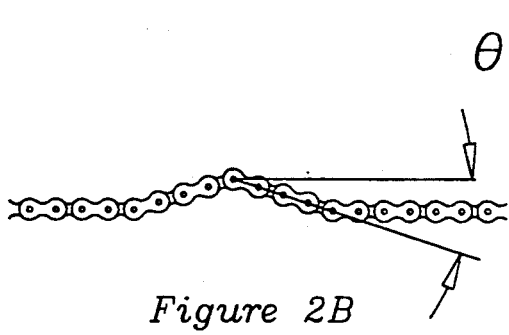
FIG. 2B is a side view of part of a bicycle chain showing the manner in which the chain is deformed by the transducer of FIG. 2A.
Figure 2C:
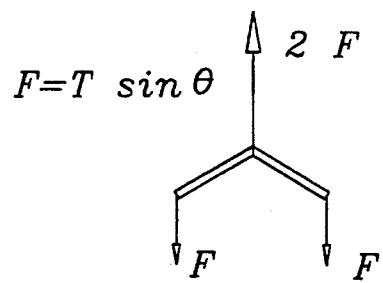
FIG. 2C is a diagrammatical illustration of the forces on the transducer in a three-point bend configuration.

The first and secondary rollers 38, 40 define a non-linear path between them which deforms the chain 20 into a three-way bend configuration, as shown in FIG. 2B.

This allows the chain 20 to apply lateral force to three points on the body member 32. The effect of the forces can then be measured to determine the chain tension. The three-point-bend configuration is the best method since it is simple and self-equilibrating. Any external reaction force required is due to secondary causes such as friction and has a magnitude much lower than that of the chain tension itself. Also, the chain continues in the original path before and after it is engaged in the device 30. The deformation induced by the loading can be measured by standard methods of strain measurement such as the electrical resistance strain gauges 42, 44, 46 and 48 as shown in FIG. 3.

Forces are exerted by the chain 20 through the contact mechanism which are the rollers or wheels 38, 40 in the present example, but the chain 20 could also slide over a track or be contacted by some other mechanism. These forces have two components (neglecting friction). The transverse component causes bending or deformation of the transducer arms 36, while the axial force will cause tensile stretching or compression. The deformation due to bending is the larger and is easier measured. The greatest deformations will occur on the upper and lower surfaces of the arms 36 and will be proportional to the chain tension. The strain gauges 42, 44, 46, 48 are bonded to these surfaces of the arms 36 and change electrical resistance as the surface is deformed.

The gauges are arranged in a bridge circuit as shown in FIG. 3. An excitation voltage is applied. If the initial resistances are equal, then E=0. As the chain tension is increased, then for an excitation voltage V applied, the output would be E=4 s kV where s is the strain on the surface of the arm 36.

An alternative and preferable method is to use leverage to reduce chain deflection and the number of gauges necessary without loss of sensitivity (voltage output/chain tension).

Figure 4:
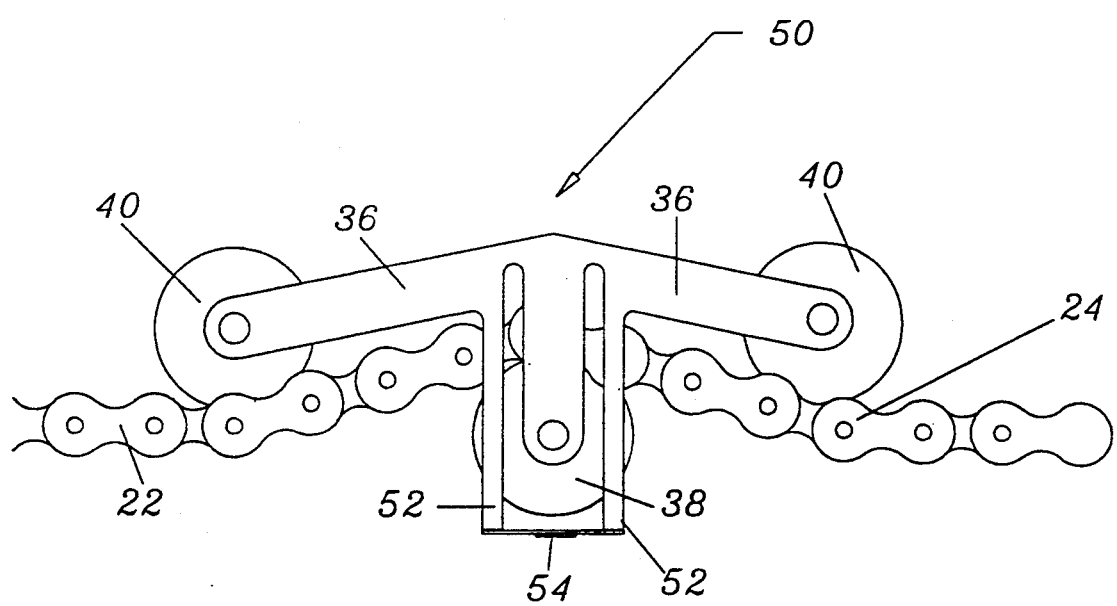
FIG. 4 is a side view of a tension transducer according to another embodiment of the invention.

This is accomplished by a transducer, generally indicated at 50 in FIG. 4, which is basically similar to the device 30 but wherein the arms 36 are provided with levers 52 extending therefrom. The spacing between the levers 52 will increase as the arms 36 are deformed. A single electrical resistance strain gauge 54, or other device which is suitable for measuring tension directly, is operative between the levers 52.

Velocity Measurement

The chain velocity can be determined from the length (1) of chain which travels through the device 30, 50 over a known period of time. Using the length of one chain link 22 (1) (FIG. 7D) as a unit of length, then velocity (v) is determined from $$v = 1 \, / \, time \ elapsed$$

which is not instantaneous but an average for one link length.

Figure 5:
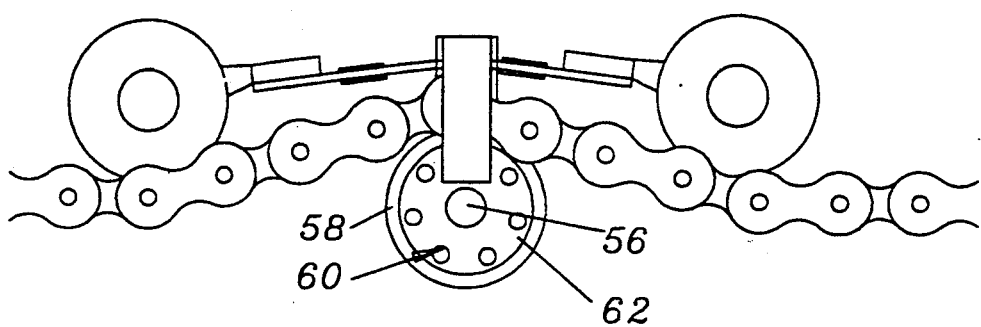
FIG. 5 is a side view, similar to FIG. 2, and showing means for measuring the speed of chain movement through the transducer.
Figure 6:
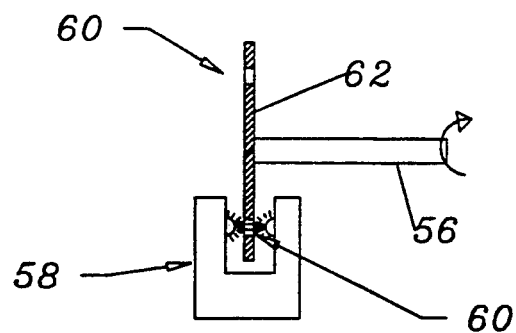
FIG. 6 is a cross section through the speed measuring means of FIG. 5.

The chain length which has passed through the device can also be determined by counting the rotations of a spindle 56 by means of an arrangement as shown in FIGS. 5 and 6. An optical switch 58 is triggered by holes 60 in a rotating disk 62 fixed to the spindle 56. The time between pulses can be used to determine velocity. The optical switch 58 includes a transmitter (not shown) on one side of the disk 62 and a receiver (not shown) on the opposite side of the disk 62.

Another method requiring no additional transducer uses the undulations in the output signal of the transducer 30, 50.

Figure 7A:
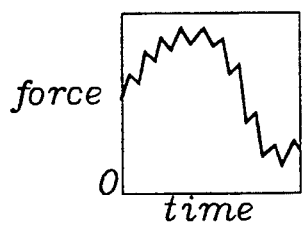
FIGS. 7A–C are diagrammatical illustrations of an original force signal, a filtered force signal and a timing signal, respectively.
Figure 7B:
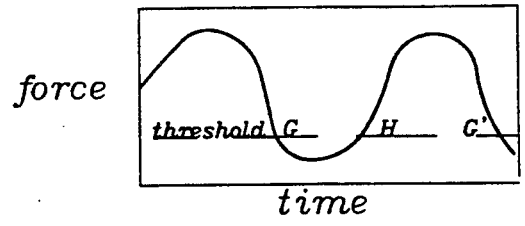
Figure 7C:
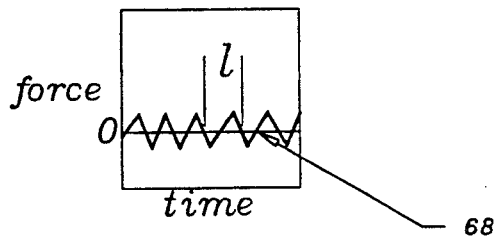
Figure 7D:
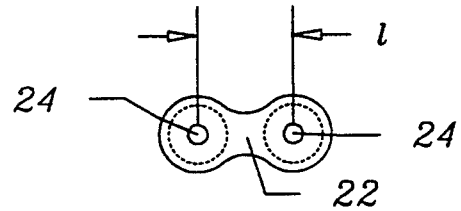
FIG. 7D is a side view of a bicycle chain link and illustrating the distance between adjacent roller centres.

The original signal from the tension transducer 30, 50 is depicted as a graph of force against time in FIG. 7A. This signal can be analyzed into two parts, i.e. a filtered component, which is the major component (FIG. 7B), and a difference component or timing signal (FIG. 7C). If the original signal, shown in FIG. 7A is denoted "A" and the filtered component is denoted "B", then the difference component is A-B. The major component B is due to the rider's cyclic exertion of force on the pedals 26. From this signal, the rider's cadence can be derived. The signal varies in a broad cyclical pattern according to the force applied by the rider. Signal A-B arises because the chain links 22 are not flexible themselves and contact with the transducer wheels 38, 40 occurs discretely so that the loading on the transducer varies cyclically as the rollers of the chain 20 contact the wheels 38, 40. The period of this variation will correspond directly to the distance (1) between the roller centres 24. Therefore, if the period of this minor oscillation is known from the signal, the average velocity with which the chain link 22 travelled through the transducer 30 will also be known from the time elapsed. The signal components can be separated by a suitable simple filter. For example, because the frequency of oscillations in A-B is necessarily much greater than in B, a filter which allows only lower frequencies than the lowest practical A-B frequency will accurately yield signal B. Then the period of the oscillation A-B can be determined from the time measured between zero crossings of A-B to determine average velocity. A zero crossing is indicated at 68 in FIG. 7C. Likewise the time between the signal B crossing a threshold value of force (between points G and G' in FIG. 7B) will yield cadence.

Power

Figure 8:
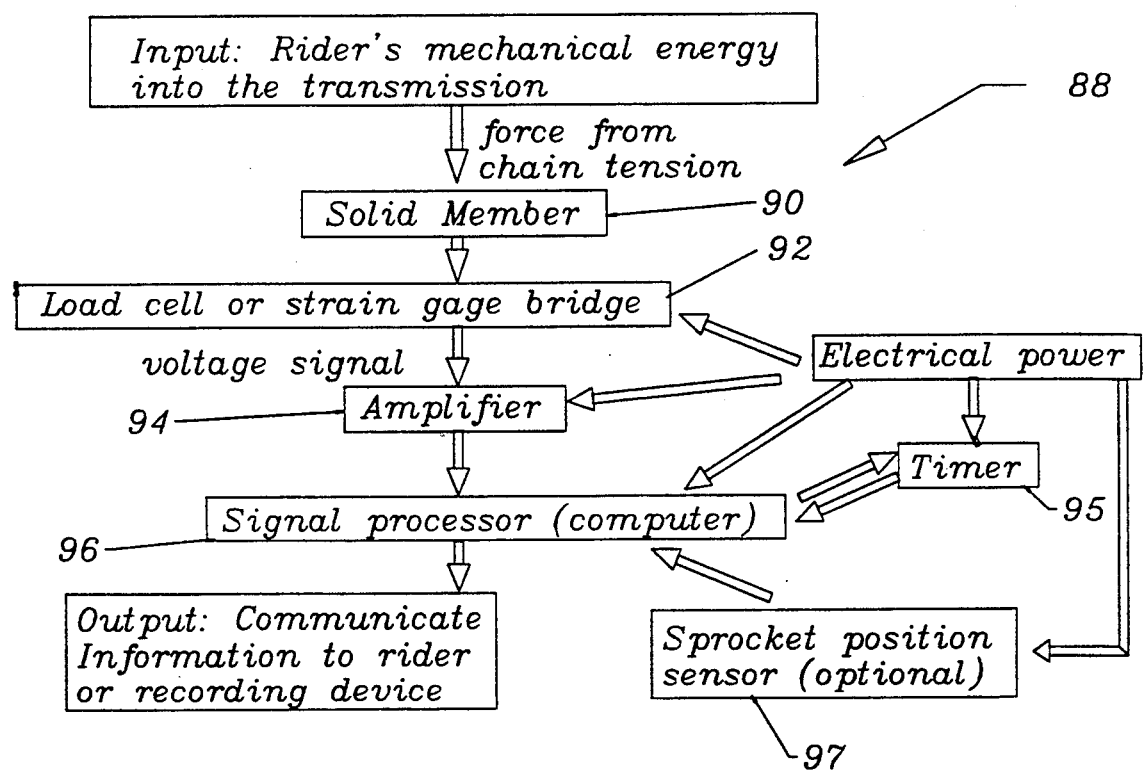
FIG. 8 is a block diagram showing the layout of a power measurement system according to the invention.
Figure 9:
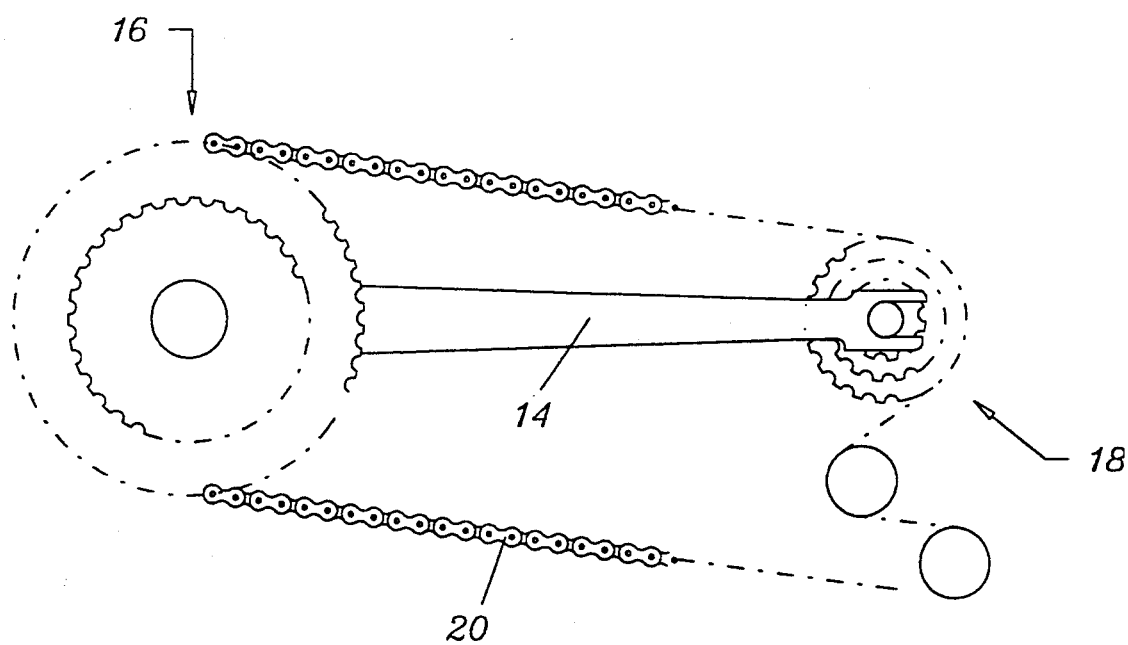
FIG. 9 is a side view of the front and rear sprockets on a derailleur transmission system.
Figure 11:
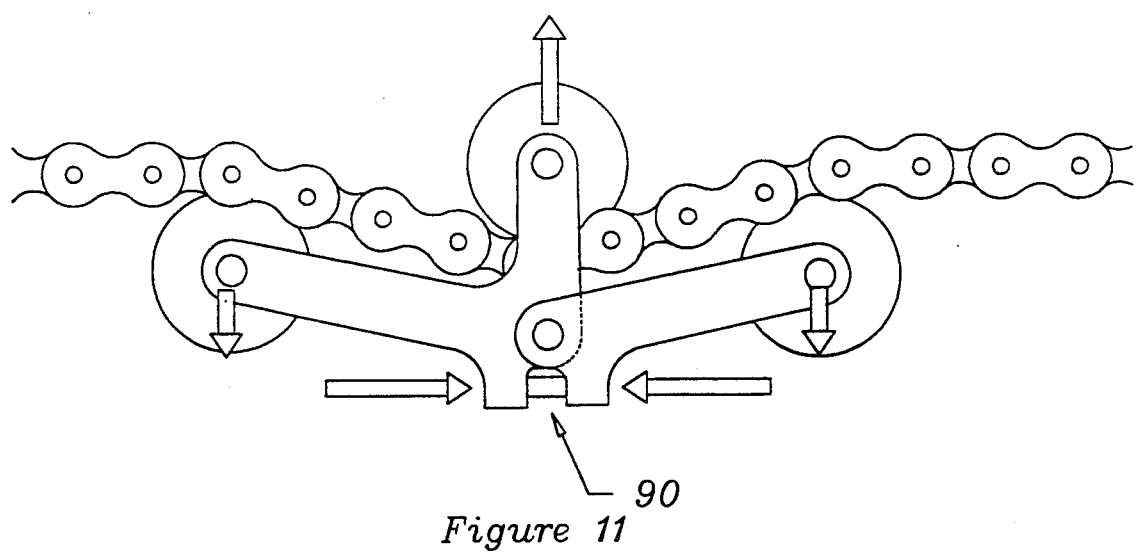
FIG. 11 is a side view of a tension transducer according to yet another embodiment of the invention.

A system layout for a power measurement apparatus 88 is shown in FIG. 8. The apparatus 88 comprises a chain tension transducer which comprises a solid body member 90 and a load cell or strain gauge bridge 92, an amplifier 94 and a signal processor 96, from where information is output and communicated to the rider at a recording device (not shown). Electrical power is supplied to the bridge 92, the amplifier 94 and the signal processor 96. The transducer may be a tension transducer, such as the transducers 30 and 50, as shown in FIGS. 2A and 4, respectively, or it may be a transducer as shown in FIG. 11 which employs a load cell. The strain gauge bridge 92 may comprise a bridge circuit such as shown in FIG. 3. The electrical signal is amplified by the amplifier 94 and then processed by the signal processor 96 to convert the information into a suitable form for output to the rider or recording device. For this purpose a timer 95 and a wheel position sensor 97 may also be included.

Because the tension of the chain 20 will vary as shown in FIG. 7, instantaneous power will provide a confusing reading for the rider. Power averaged over a complete cycle is a better output. Average power can be obtained with reasonable accuracy from the energy expended between zero crossings 68, of the transducer output, i.e. from Equation [3]. This is done in the signal processor 96.

The signal processing can be done efficiently using digital logic or a microprocessor. The integral in Equation [2] can be obtained by numerical integration.

Mounting Apparatus

Figure 10A:
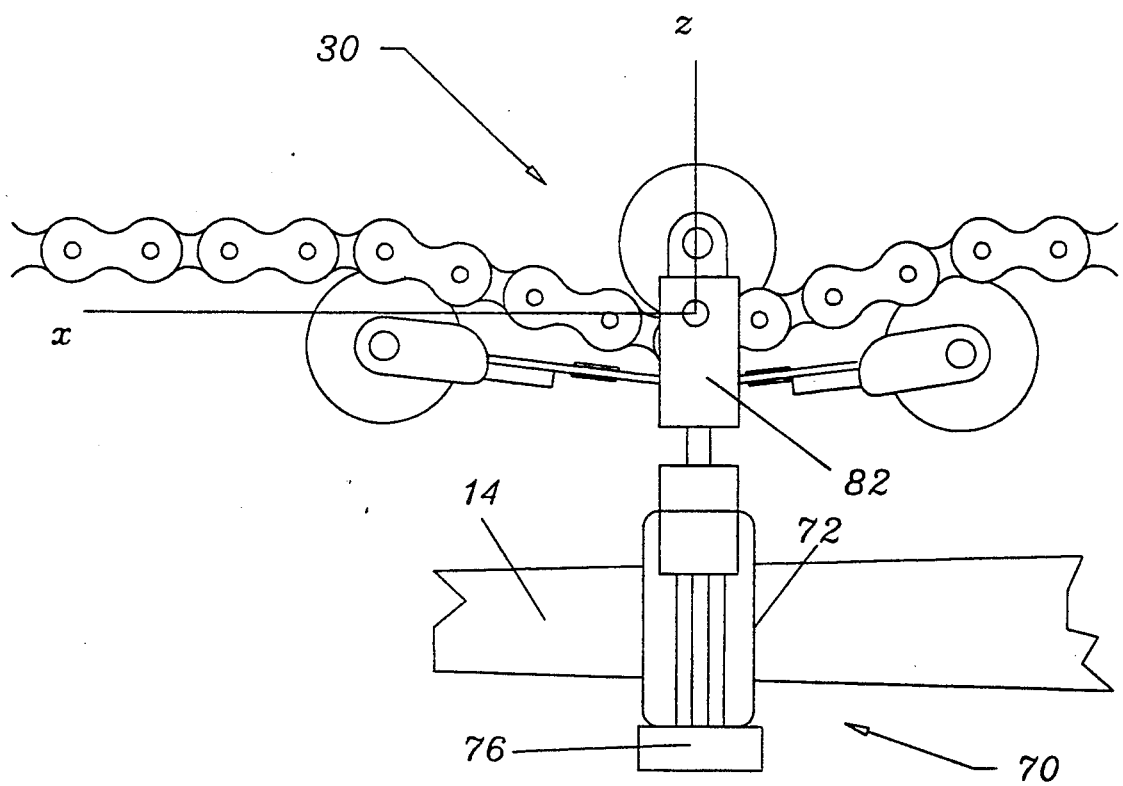
FIGS. 10A and B are side and end views, respectively, of a bicycle chain tension measuring device according to another embodiment of the invention.
Figure 10B:
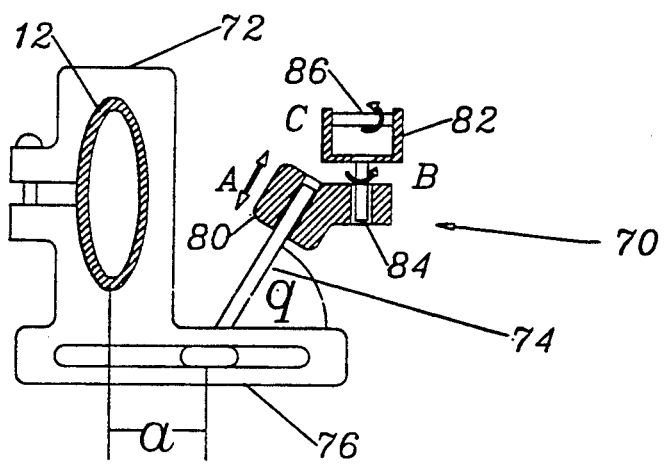

The device 30, 50 is mounted to the bicycle frame 12 on the rearwardly extending tube 14 of the bicycle frame 12 through a suitable linkage, generally indicated at 70 in FIGS. 10A and 10B. The linkage 70 must be such that the proper motion of the chain 20 is not altered. For derailleur-type gearing, the orientation of the chain 20 with respect to the frame 12 changes depending on which sprockets are engaged front and rear.

The linkage 70 comprises a bracket 72 which is mounted on the tube 4 of the bicycle frame 12. A linkage arm 74 is connected to the bracket 72 through a connection member 76, which allows for adjustment of the distance "a" and angle "q", shown in FIG. 10B, to suit a particular bicycle. A second connection member 80 is provided on the linkage arm 74 and is capable of free longitudinal movement relative to the arm 74 between a pair of extreme positions. A yoke 82 is mounted on the member 80 for pivotal movement about a first axis 84. A tension transducer, such as the transducer 30, is mounted to the yoke 82 for pivotal movement about a second axis 86, which coincides with the rotation axis of the first roller 38. The motions allowed by the linkage 70 from the frame 12 to the transducer 30 preserves stable motion since the transducer 30 can only rotate about the two axes 84 and 86. (The movement along the arm 76 is a sliding motion only.) The sliding motion allows the transducer 30 to direct the chain 20 between the front and rear sprockets 16 and 18 with negligible diversion. The position of the transducer 30 is moved to position by the chain 20 rather than by connection to the derailleur system 11, for simplicity. Therefore, the transducer 30 freely follows the direction of the chain path so that the chain 20 enters and exits the transducer 30 along very nearly the same path (as it would in the absence of the transducer).

The linkage 70 must provide rigid support through the force centre of the transducer 30 in the x direction (along the chain path). The reactions at the frame 12 must be such that there is no z component (FIG. 10) which would imbalance the pure three-point bend loading on the transducer 30. The reaction in the x direction should be equal and opposite to the drag force exerted by the chain due to friction and other drag forces. The drag force should be minimized to avoid taxing the rider and to avoid excessive force on the linkage 70 and frame 12. The y reaction should be minimal in any case.

Design Optimization

Design objectives of the apparatus 88 are:
most of all, it should not interfere with the proper function of the system to which it is attached (e.g. a bicycle),
it should be very lightweight and durable for high performance applications,
it should apply negligible drag force to the chain so that the rider is not taxed by the apparatus,
noise and vibration should be minimized so as not to discomfort the rider or damage the system, and
the apparatus should be reasonably accurate.

The vehicle should be driven in as natural a manner as possible while measurements are taken unobtrusively. Other considerations are low electrical power consumption (e.g. the strain gauges used should be of high resistance to minimize power consumption, since power consumed $=V^2/R$), information readout, and universal application.

Reference has been made to a chain 20 in the present examples, but it will be appreciated that the device 30, 50 is also applicable to similar type transmissions, such as belts or ropes and pulleys.

While only preferred embodiments of the invention have been described herein in detail, the invention is not limited thereby and modifications can be made within the scope of the attached claims. For example, the tension transducer does not need to have a deformable body. In an alternative embodiment, the lateral force can be transmitted to a load cell, such as shown in FIG. 11. Thus, the body member may include any means effective to change an electrical characteristic thereof in response to the applied lateral force.

What is claimed is:
1. An apparatus for measuring the tension in an elongate flexible manner, comprising:
a body member provided with first and second engagement means thereon and having a central part and a pair of arms extending from the center part, said second engagement means being provided on the arms, said first and second engagement means being arranged in opposed relationship and defining anon-linear path therebetween for receiving a tensioned elongate flexible member along said path and in engagement with said first and second engagement means to apply a lateral force between said first and second engagement means, wherein said body is capable of being deformed by said lateral force, the amount of deformation being in proportion to the lateral force, and further comprising means for measuring said deformation, and wherein a lever is provided on each arm, the levers being arranged in spaced relationship and arranged for the spacing between the arms to increase in proportion to said deformation of the body member and wherein said deformation measuring means is responsive to the distance between said levers.

2. The apparatus according to claim 1, further comprising a load cell on the body member for measuring said lateral force.

3. The apparatus according to claim 1, wherein said path is in the form of a three-point bend.

4. The apparatus according to claim 3, wherein said first engagement means comprises a first roller rotatably attached to said body member and forming the centre bend of said three-point bend.

5. The apparatus according to claim 4, wherein said arms extend equidistantly laterally of said first roller and wherein said second engagement means comprises a second roller rotatably mounted on each of said arms and forming the outer bends of said three-point bend.

6. The apparatus according to claim 1, wherein said first and second engagement means allows longitudinal movement of said tensioned member through said apparatus and further comprising means for measuring the speed of said movement.

7. The apparatus according to claim 6, wherein one of said first and second engagement means comprises a roller for rotation by said tensioned member during said movement of said tensioned member and wherein said speed measuring means comprises means for counting the number of rotations of said roller per unit time.

8. The apparatus according to claim 7, wherein said roller is a sprocket.

9. The apparatus according to claim 6, wherein the speed measuring means comprises means for measuring the frequency of cyclical variations in said lateral force.

10. An apparatus for measuring the tension in an elongate flexible member, comprising a body member provided with first and second engagement means thereon, said first and second engagement means being arranged in opposed relationship and defining a non-linear path therebetween for receiving a tensioned elongate flexible member along said path and in engagement with said first and second engagement means to apply a lateral force between said first and second engagement means, wherein said first and second engagement means allows longitudinal movement of said tensioned member through said apparatus and further comprising means for measuring the speed of said movement, which speed-measuring means comprises means for measuring the frequency of cyclical variations in said lateral force.

11. A chain tension measuring device for a bicycle, comprising a transducer for engagement with a bicycle chain and mounting apparatus for mounting the transducer on a bicycle, wherein the transducer comprises a body member provided with first and second engagement means thereon and having a central part and a pair of arms extending from the central part, said second engagement means being provided on the arms, said first and second engagement means being arranged in opposed relationship and defining a non-linear path therebetween for receiving the bicycle chain along said path and in engagement with said first and second engagement means to apply a lateral force between said first and second engagement means, wherein said body is capable of being deformed by said lateral force, the amount of deformation being in proportion to the lateral force, and further comprising means for measuring said deformation, and wherein a lever is provided on each arm, the levers being arranged in spaced relationship and arranged for the spacing between the arms to increase in proportion to said deformation of the body member and wherein said deformation measuring means is responsive to the distance between said levers.

12. The device according to claim 11, wherein the transducer further comprises means for measuring the speed of movement of said bicycle chain therethrough.

13. The device according to claim 12, wherein said path is in the form of a three-point bend.

14. The device according to claim 13, wherein said first engagement means comprises a first roller rotatably attached to said body member and forming the entire bend of said three-point bend.

15. The device according to claim 14, wherein said arms extend equidistantly laterally of said first roller and wherein said second engagement means comprises a second roller rotatably mounted on each of said arms and forming the outer bends of said three-point bend.

16. The device according to claim 15, wherein said speed measuring means comprises means fort counting the number of revolutions of one of said rollers per unit time.

17. The device according to claim 12, wherein said speed measuring means comprises means for measuring the frequency of cyclical variations in said lateral force.

18. The device according to claim 17, wherein said cyclical variations are the variations in the signal caused by chain roller impacts of said bicycle chain.

19. The device according to claim 17, wherein said cyclical variations are the variations in the tension of said chain caused by the cyclical application of force by a rider of the bicycle.

20. The device according to claim 11, wherein said mounting apparatus comprises a bracket for mounting on a bicycle, a linkage connected to and extending from the bracket; and a connection member connected to the linkage for pivotal movement about a first axis; wherein said transducer is connected to the connection member for pivotal movement about a second axis perpendicular to said first axis; and wherein said connection member is capable of free longitudinal movement between limiting positions relative to said linkage.

21. A chain tension measuring device for a bicycle, comprising a transducer for engagement with a bicycle chain and mounting apparatus for mounting the transducer on a bicycle, wherein the transducer comprises a body member provided with first and second engagement means thereon and having a central part and a pair of arms extending from the central part, said second engagement means being provided on the arms, said first and second engagement means being arranged in opposed relationship and defining a non-linear path therebetween for receiving the bicycle chain along said path and in engagement with said first and second engagement means to apply a lateral force between said first and second engagement means, wherein said body is capable of being deformed by said lateral force, the amount of deformation being in proportion to the lateral force, and further comprising means for measuring said deformation, and wherein said mounting apparatus comprises a bracket for mounting on a bicycle, a linkage connected to and extending from the bracket; and a connection member connected to the linkage for pivotal movement about a first axis; wherein said transducer connected to the connection member for pivotal movement about a second axis perpendicular to said first axis; and wherein said confection member is capable of free longitudinal movement between limiting positions relative to said linkage.

22. The device according to claim 21, wherein the transducer further comprises means for measuring the speed of movement of said bicycle chain therethrough.

23. The device according to claim 22, wherein said speed measuring means comprises means for measuring the frequency of cyclical variations in said lateral force.

24. A chain tension measuring device for a bicycle, comprising a transducer for engagement with a bicycle chain and mounting apparatus for mounting the transducer on a bicycle, wherein the transducer comprises a body member provided with first and second engagement means thereon, said first and second engagement means being arranged in opposed relationship and defining a non-linear path therebetween for receiving the bicycle chain along said path and in engagement with said first and second engagement means to apply a lateral force between said first and second engagement means, wherein said first and second engagement means allows longitudinal movement of said bicycle chain through said transducer and further comprising means for measuring the speed of said movement, which speed-measuring means comprises means for measuring the frequency of cyclical variations in said lateral force.

25. The device according to claim 24, wherein said mounting apparatus comprises a bracket for mounting on a bicycle, a linkage connected to and extending from the bracket; and a connection member connected to the linkage for pivotal movement about a first axis; wherein said transducer is connected to the connection member for pivotal movement about a second axis perpendicular to said first axis; and wherein said confection member is capable of free longitudinal movement between limiting positions relative to said linkage.

26. The device according to claim 24, wherein said cyclical variations are variations in the tension of the chain caused by the cyclical application of force by a rider of the bicycle.

* * * * *

UNITED STATES PATENT AND TRADEMARK OFFICE
CERTIFICATE OF CORRECTION

PATENT NO. : 5,167,159

DATED : December 1, 1992

INVENTOR(S) : William M. LUCKING

It is certified that error appears in the above-identified patent and that said Letters Patent is hereby corrected as shown below:

Column 6, line 63: change "center" to --central--.

Column 6, line 67: change "anon-linear" to --a non-linear--.

Column 8, line 24: change "entire" to --centre--.

Column 9, line 13: after "transducer", insert --is--.

Column 10, line 22: change "confection" to --connection--.

Signed and Sealed this

Nineteenth Day of October, 1993

Attest:

BRUCE LEHMAN

*Attesting Officer*     *Commissioner of Patents and Trademarks*